(12) United States Patent
Ramorini et al.

(10) Patent No.: US 9,564,800 B2
(45) Date of Patent: *Feb. 7, 2017

(54) HIGH-EFFICIENCY ENERGY HARVESTING INTERFACE AND CORRESPONDING ENERGY HARVESTING SYSTEM

(71) Applicant: STMICROELECTRONICS S.R.L., Agrate Brianza (IT)

(72) Inventors: Stefano Ramorini, Arluno (IT); Alessandro Gasparini, Cusano Milanino (IT); Alberto Cattani, Cislago (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,394

(22) Filed: May 24, 2016

(65) Prior Publication Data

US 2016/0268887 A1   Sep. 15, 2016

Related U.S. Application Data

(63) Continuation of application No. 14/749,254, filed on Jun. 24, 2015, now Pat. No. 9,379,615.

(30) Foreign Application Priority Data

Sep. 17, 2014  (IT) .............................. TO2014A0735

(51) Int. Cl.
  *H02M 3/02*  (2006.01)
  *H02J 3/38*  (2006.01)
  *H02J 7/35*  (2006.01)

(52) U.S. Cl.
  CPC ............... *H02M 3/02* (2013.01); *H02J 3/385* (2013.01); *H02J 7/35* (2013.01)

(58) Field of Classification Search
  CPC .................................... H02M 3/02; H02J 7/35
  See application file for complete search history.

(56) References Cited

U.S. PATENT DOCUMENTS 4,255,789 A  3/1981  Hartford et al.
5,903,130 A  5/1999  Rice et al.
(Continued)

OTHER PUBLICATIONS

Bandyopadhyay et al., "Platform Architecture for Solar, Thermal, and Vibration Energy Combining with MPPT and Single Inductor," IEEE Journal of Solid-State Circuits, vol. 47, No. 9, Sep. 2012. 17 pages.

(Continued)

*Primary Examiner* — Timothy J Dole
*Assistant Examiner* — Yusef Ahmed
(74) *Attorney, Agent, or Firm* — Seed IP Law Group LLP (57) ABSTRACT

An electrical-energy harvesting system envisages a transducer for converting energy from an environmental energy source into a transduced signal, an electrical energy harvesting interface for receiving the transduced signal and for supplying a harvesting signal, and an energy storage element coupled to the electrical energy harvesting interface for receiving the harvesting signal. The electrical-energy harvesting system also includes a voltage converter connected to the electrical energy harvesting interface for generating a regulated voltage. The harvesting interface samples an open-circuit voltage value of the transduced signal, generates an optimized voltage value starting from the open-circuit voltage value, and generates an upper threshold voltage and a lower threshold voltage on the basis of the optimized voltage value. The harvesting interface controls the voltage converter in switching mode so that the harvesting signal has a value between the upper and lower threshold voltages in at least one operating condition.

20 Claims, 8 Drawing Sheets

(56) References Cited

U.S. PATENT DOCUMENTS

| | | | |
|---|---|---|---|
| 5,949,054 A * | 9/1999 | Karpen | G06K 7/10851 235/462.01 |
| 5,949,197 A | 9/1999 | Kastner | |
| 6,111,767 A * | 8/2000 | Handleman | G05F 1/67 136/293 |
| 8,193,798 B1 | 6/2012 | Pace et al. | |
| 8,749,218 B2 | 6/2014 | Mateu et al. | |
| 2004/0135562 A1 | 7/2004 | Oden | |
| 2006/0061342 A1 | 3/2006 | Bernacchia et al. | |
| 2010/0026479 A1 | 2/2010 | Tran | |
| 2011/0260536 A1 | 10/2011 | Roy et al. | |
| 2011/0298442 A1 | 12/2011 | Waltisperger et al. | |
| 2012/0109399 A1 | 5/2012 | Tran | |
| 2012/0119569 A1 | 5/2012 | Karalis et al. | |
| 2012/0274134 A1 | 11/2012 | Gasparini et al. | |
| 2012/0274144 A1 * | 11/2012 | Gasparini | B60C 23/041 307/80 |
| 2012/0293021 A1 * | 11/2012 | Teggatz | H02J 7/35 307/151 |
| 2014/0084876 A1 * | 3/2014 | Ramorini | H02M 3/1588 320/166 |
| 2014/0084900 A1 * | 3/2014 | Ramorini | H02M 3/155 323/355 |
| 2014/0097814 A1 * | 4/2014 | Brewster | H02M 3/156 323/282 |
| 2014/0142876 A1 | 5/2014 | John et al. | |
| 2014/0239917 A1 | 8/2014 | Bottarel et al. | |
| 2014/0247020 A1 | 9/2014 | Stankovic et al. | |
| 2014/0292236 A1 | 10/2014 | Ortiz | |
| 2015/0214841 A1 | 7/2015 | Ramorini et al. | |
| 2015/0234416 A1 * | 8/2015 | Ramorini | G05F 5/00 323/299 |

OTHER PUBLICATIONS

Brunelli et al., "Photovoltaic scavenging systems: Modeling and optimization," *Microelectronics Journal* 40:1337-1344, 2009.

Cho et al., "A Coreless Maximum Power Point Tracking Circuit of Thermoelectric Generators for Battery Charging Systems," IEEE Asian Solid-State Circuits Conference, Beijing, Nov. 8-10, 2010, 4 pages.

Dini et al., "A Fully-Autonomous Integrated RF Energy Harvesting System for Wearable Applications," Proceedings of the 43rd European Microwave Conference (EuMC), Nuremberg, Oct. 6-10, 2013, pp. 987-990.

Huang et al., "Thermoelectric Energy Harvesting with lmV Low Input Voltage and 390nA Quiescent Current for 99.6% Maximum Power Point Tracking," 38th European Solid-State Circuits Conference (ESSCIRC), Bordeaux, Sep. 17-21, 2012, pp. 105-108.

Italian Search Report dated May 13, 2015, for corresponding IT Application No. T020140735, 10 pages.

Kadirvel et al., "A 330nA Energy-Harvesting Charger with Battery Management for Solar and Thermoelectric Energy Harvesting," IEEE International Solid-State Circuits Conference, Feb. 20, 2012. 3 pages.

Kim et al., "A Seamless Mode Transfer Maximum Power Point Tracking Controller for Thermoelectric Generator Applications," *IEEE Transactions on Power Electronics* 23(5):2310-2318, Sep. 2008.

Kim et al., "Aggregated Modeling and Control of a Boost-Buck Cascade Converter for Maximum Power Point Tracking of a Thermoelectric Generator," IEEE Applied Power Electronics Conference and Exposition, 2008. APEC 2008. 7 pages.

Ni et al., "A Power Conditioning System for Thermoelectric Generator Based on Interleaved Boost Converter with MPPT Control," Electrical Machines and Systems (ICEMS), 2011 International Conference on. IEEE, 2011. 6 pages.

Weddell et al., "Photovoltaic Sample-and-Hold Circuit Enabling MPPT Indoors for Low-Power Systems," *IEEE Transactions on Circuits and Systems—I: Regular Papers* 59(6):1196-1204, Jun. 2012.

Weddell et al., "Ultra Low-Power Photovoltaic MPPT Technique for Indoor and Outdoor Wireless Sensor Nodes," Design, Automation & Test in Europe Conference & Exhibition, Grenoble, Mar. 14-18, 2011, 4 pages.

Yu et al., "Indoor Micro-Light Energy Harvesting System for Low Power Wireless Sensor Node," Proceedings Power MEMS, Nov. 30, 2010, pp. 21-24.

* cited by examiner

HIGH-EFFICIENCY ENERGY HARVESTING INTERFACE AND CORRESPONDING ENERGY HARVESTING SYSTEM

CROSS-REFERENCE TO RELATED APPLICATIONS

The present application is a Continuation of U.S. patent application Ser. No. 14/749,254, filed on Jun. 24, 2015, which is incorporated by reference in its entirety, and which, along with the present application, claims priority to Italian Patent Application TO2014A000735, filed on Sep. 17, 2014.

BACKGROUND

Technical Field

The present disclosure relates to a high-efficiency energy harvesting interface and to a corresponding energy harvesting system.

Description of the Related Art

As is known, systems for harvesting (or scavenging) energy from mechanical or environmental energy sources arouse considerable interest in a wide range of technological fields, for example in the field of portable electronic devices or in the automotive field.

Typically, energy harvesting systems are designed to harvest, store, and transfer energy generated by mechanical or environmental sources to a generic electrical load, which may be supplied, or, in the case of a battery, recharged. These systems thus enable production of electronic apparatuses that operate without a battery, or with a considerable increase in the duration of batteries in the case of apparatuses provided therewith.

For harvesting environmental energy, solar or thermoelectric generators may be used, which convert solar energy and thermal energy, respectively, into electrical energy.

Figure 1:
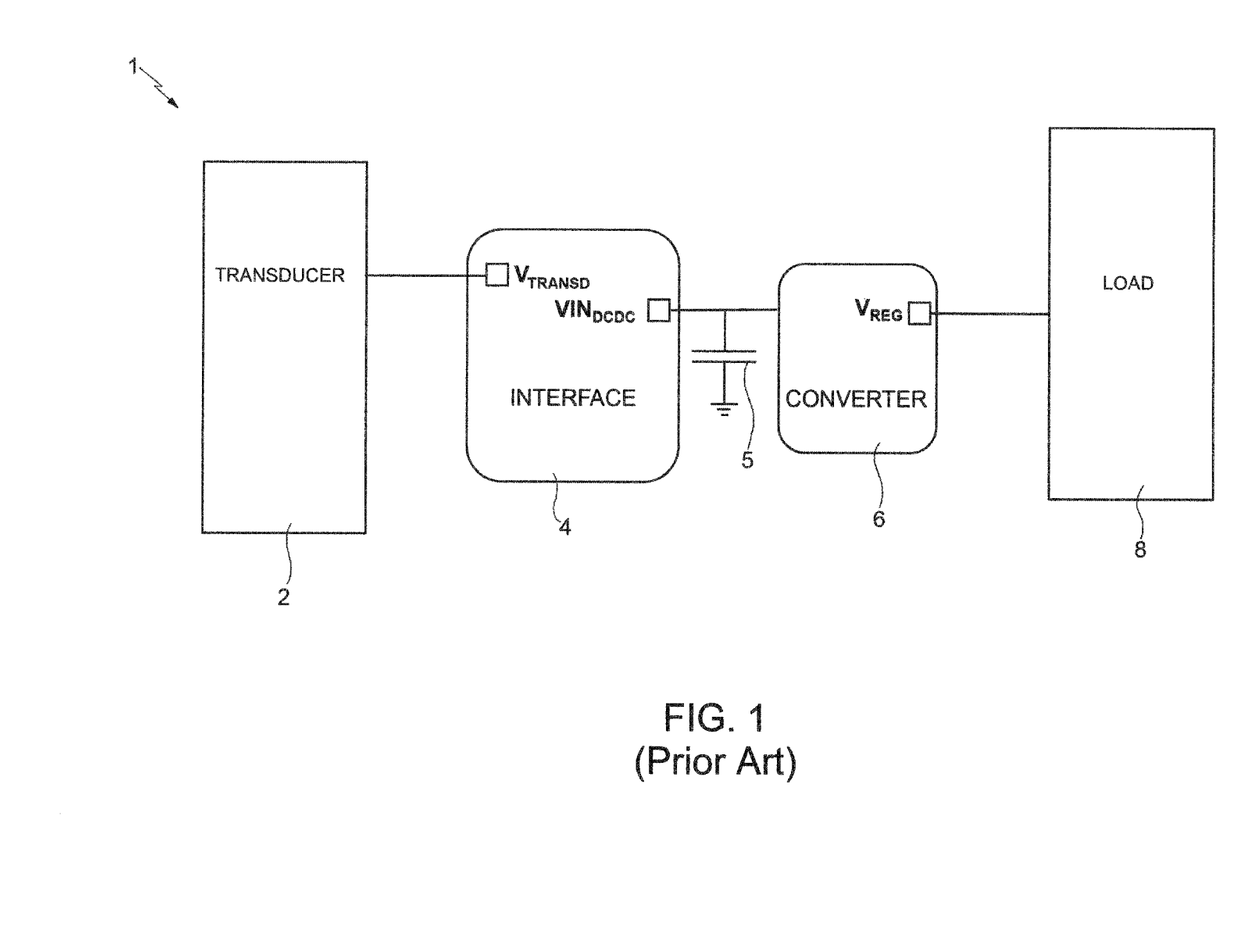
FIG. 1 shows an energy harvesting system according to a known embodiment.

FIG. 1 shows schematically and by functional blocks, an energy harvesting system of a known type.

The energy harvesting system 1 comprises a transducer 2, for example a photovoltaic or thermoelectric generator that includes a plurality of cells (of a known type, not described in detail herein), which converts solar energy or thermal energy into electrical energy, typically into a DC voltage or, in any case, into a voltage that varies slowly in time (with respect to the electrical constants of the circuit), generating a transduction signal $V_{TRANSD}$.

The energy harvesting system 1 further comprises a harvesting interface 4, designed to provide a condition of coupling with the transducer 2 of the MPPT (Maximum Power Point Tracking) type, in order to maximize extraction of power. The harvesting interface 4 is configured to receive at input the transduction signal $V_{TRANSD}$ generated by the transducer 2 and supply at output a harvesting signal $VIN_{DCDC}$.

The energy harvesting system 1 further comprises: a storage capacitor 5, which is connected to the output of the harvesting interface 4 and receives the harvesting signal $VIN_{DCDC}$, which determines charging thereof and consequent storage of energy; and a DC-DC converter 6, connected to the storage capacitor 5 for receiving at input the stored electrical energy and generating at output a regulated signal $V_{REG}$, with an appropriate value so that it may be supplied to an electrical load 8, for its supply or its recharging.

The global efficiency $\eta_{TOT}$ of the energy harvesting system 1 is given by the expression:

$$\eta_{TOT} = \eta_{TRANSD} \cdot \eta_{MPPT} \cdot \eta_{DCDC}$$

where: $\eta_{TRANSD}$ is the efficiency of the transducer 2, indicating the amount of environmental energy, effectively converted by the transducer 2 into electrical energy; $\eta_{MPPT}$ is the efficiency of the harvesting interface 4, indicating the amount of converted electrical energy that is effectively used for charging the storage capacitor 5; and $\eta_{DCDC}$ is the efficiency of the DC-DC converter 6.

In particular, the efficiency $\eta_{MPPT}$ of the harvesting interface 4 indicates the ratio between the power effectively transferred onto the storage capacitor 5 and the maximum power that could theoretically be supplied, $P_{MAX}$.

In detail, this efficiency $\eta_{MPPT}$ is given by the following expression:

$$\eta_{MPPT} = \eta_{COUPLE} \cdot \eta_{LOSS}$$

where $\eta_{COUPLE}$ is the coupling factor between the transducer 2 and the harvesting interface 4 (indicating the impedance matching between the same transducer 2 and the harvesting interface 4), and $\eta_{LOSS}$ is the loss of power due to consumption by the harvesting interface 4.

Figure 2A:
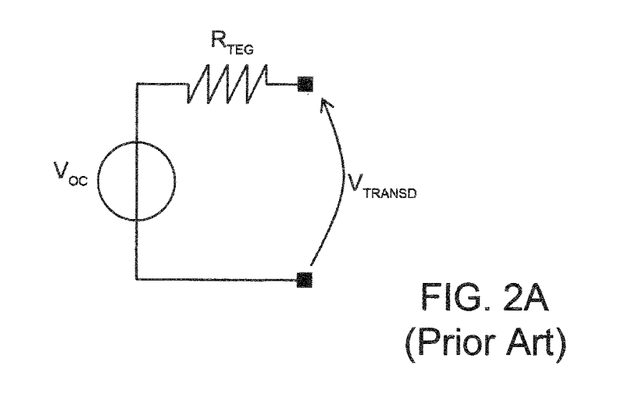
FIGS. 2a and 2b show the equivalent circuit diagrams of a transducer, including a thermoelectric cell or a photovoltaic cell, respectively.

It has been shown that, in the case of a thermoelectric cell, which may be represented schematically, as illustrated in FIG. 2a, as an equivalent voltage generator $V_{OC}$ connected to a series resistance $R_{TEG}$, the efficiency $\eta_{MPPT}$ is maximized in the case where the transduction signal $V_{TRANSD}$ has an optimized value $V_{MPPT}$ equal to $V_{OC}/2$ (i.e., a value equal to one half of the load-less, or open-circuit, voltage supplied by the corresponding equivalent voltage generator).

Figure 2B:
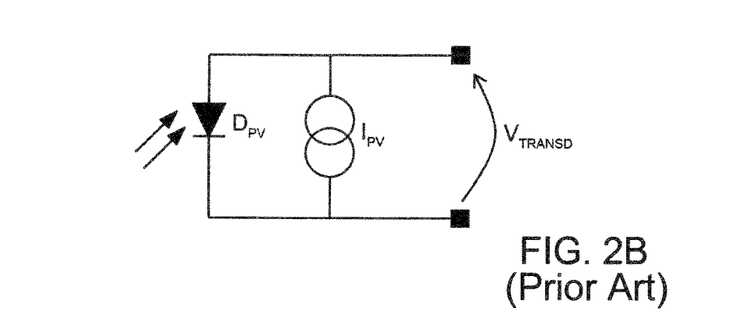

Likewise, in the case of a photovoltaic cell, which may be represented schematically, as illustrated in FIG. 2b, as an equivalent current generator $I_{PV}$ connected in parallel to a diode $D_{PV}$ (in the figure, the equivalent series resistance of the generator is not represented), the efficiency $\eta_{MPPT}$ is maximized in the case where the transduction signal $V_{TRANSD}$ has an optimized value $V_{MPPT}$ comprised between $0.75 \cdot V_{OC}$ and $0.9 \cdot V_{OC}$ (according to the constructional parameters of the photovoltaic cell and the material of which it is made), for example equal to $0.8 \cdot V_{OC}$, where $V_{OC}$ is once again the open-circuit voltage supplied by the photovoltaic cell.

It is consequently required that the harvesting interface 4 of the energy harvesting system 1 be configured in such a way that the transducer 2 operates in, or around, a working point that ensures the aforesaid condition of maximum efficiency.

For this purpose, a wide range of circuit configurations have been proposed for providing the harvesting interface 4.

For instance, in the document entitled "A Seamless Mode Transfer Maximum Power Point Tracking Controller for Thermoelectric Generator Applications" by Rae-Young Kim, Jih-Sheng Lai, IEEE Transactions on Power Electronics, vol. 23, No. 5, September 2008, an interface circuit has been proposed, comprising a dual voltage conversion stage, formed by the cascade of a boost converter and a buck converter, the latter being designed to regulate the value of the output voltage. Tracking of the MPPT condition is obtained with a continuous-time control of the duty cycle of the boost converter.

The present Applicant has, however, realized that this solution involves a high power consumption, which is due to the fact that the control is of a continuous-time type, which does not render it suited to energy harvesting applications. Further, this solution does not prove flexible, being suited only to a specific type of transducer and to precise values of the electrical parameters associated thereto, further depending upon the tolerance in the values assumed by the same electrical parameters. In general, this solution also involves a large number of external components, which may not be made with integrated technology.

Another possible circuit implementation is described in the document entitled "Thermoelectric Energy Harvesting with 1 mV Low Input Voltage and 390 nA Quiescent Current for 99.6% Maximum Power Point Tracking" by Chao-Jen Huang, Wei-Chung Chen, Chia-Lung Ni, Ke-Horng Chen, Chien-Chun Lu, Yuan-Hua Chu, and Ming-Ching Kuo, 38th European Solid-State Circuits Conference (ESSCIRC), September 2012. This solution envisages a boost converter and a continuous-time algorithm, the so-called perturbation and observation algorithm, to achieve the MPPT condition; in particular, the duty cycle of the converter is perturbed, and the trend of the output voltage is measured: the MPPT condition corresponds to a maximum positive trend.

The present Applicant has, however, realized that also this solution has some disadvantages, amongst which: a high power consumption, intrinsic in a continuous-time perturbation and observation algorithm, which renders it difficult to use in energy harvesting applications; and a poor efficiency, when combined to a low-power transducer.

The document entitled "A Coreless Maximum Power Point Tracking Circuit of Thermoelectric Generators for Battery Charging Systems", by S. Cho, N. Kim, S. Park, S. Kim, IEEE Asian Solid-State Circuits Conference, Nov. 8-10, 2010, Beijing, China, describes yet a further solution for providing the harvesting interface. This solution envisages two conversion stages, with the cascade of a boost conversion stage and a buck conversion stage, the latter for regulation of the output voltage; the MPPT condition is achieved by a control of the switch in the boost stage.

The present Applicant has realized that also this solution, albeit presenting a simpler algorithm to achieve the MPPT condition, does not have a high efficiency, on account of the presence of two conversion stages. Further, also this solution requires a large number of external components, not made with integrated technology.

The subject matter discussed in the Background section is not necessarily prior art and should not be assumed to be prior art merely as a result of its discussion in the Background section. Along these lines, any recognition of problems in the prior art discussed in Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

The present disclosure provides an energy harvesting interface that will enable the aforementioned problems and disadvantages to be overcome, in full or in part, and in particular that will provide a high efficiency.

According to the present disclosure, an energy harvesting system provided with an energy harvesting interface is consequently provided, as defined in the annexed claims.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. For a better understanding of the present disclosure, preferred embodiments thereof are now described purely by way of non-limiting example and with reference to the attached drawings, wherein.

DETAILED DESCRIPTION

Figure 3:
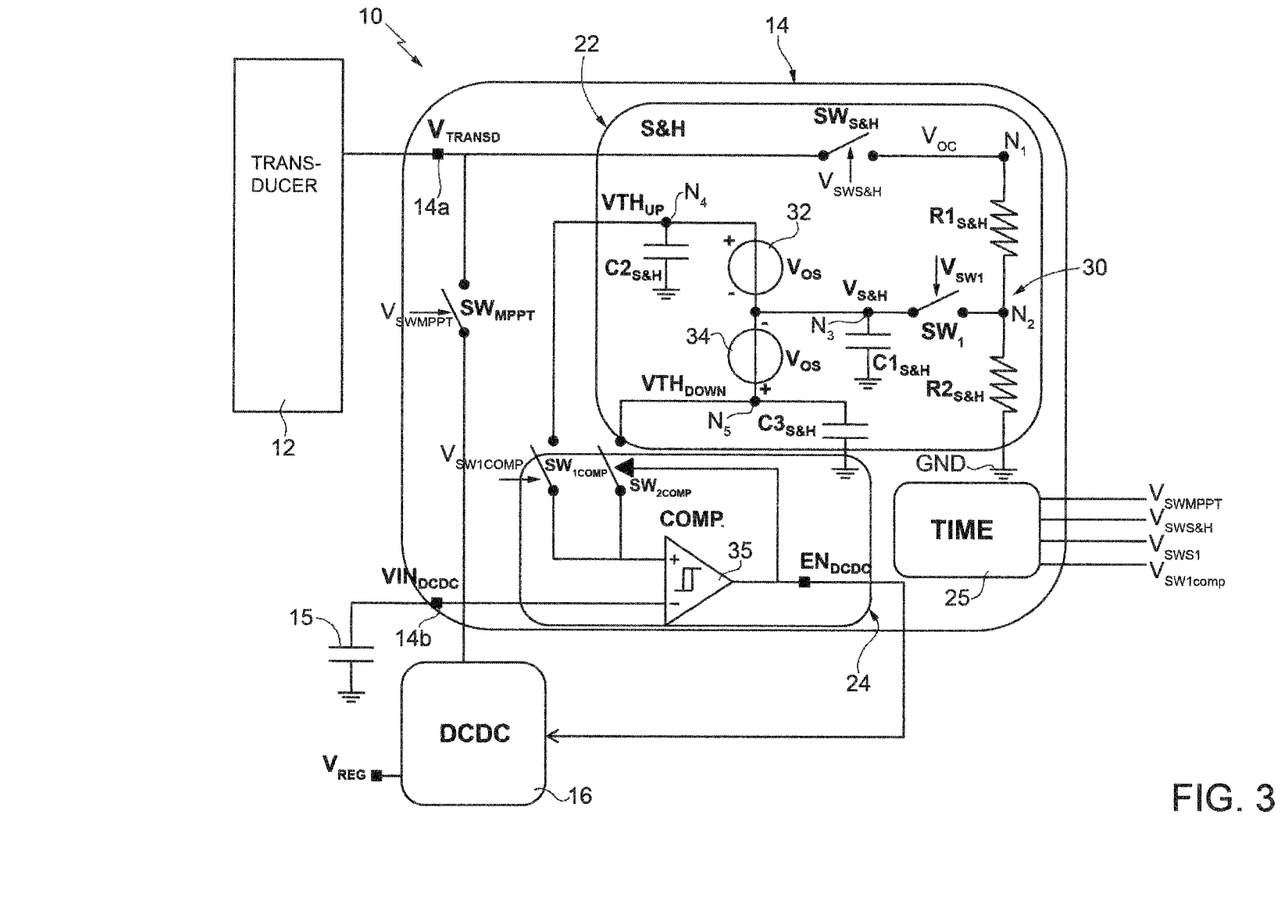
FIG. 3 shows a circuit diagram of an energy harvesting system according to one embodiment of the present solution.

As illustrated in FIG. 3, an energy harvesting system 10 according to one embodiment of the present solution, comprises in general, and substantially as has been described previously: a transducer 12, in particular a photovoltaic or thermoelectric generator, which generates a transduction signal $V_{TRANSD}$, in particular a DC voltage or a slowly varying voltage; a harvesting interface 14, which provides a MPPT coupling, receives the transduction signal $V_{TRANSD}$, on an input terminal 14a, and supplies a harvesting signal $VIN_{DCDC}$, on an output terminal 14b; a storage capacitor 15, which is connected to the output terminal 14b of the harvesting interface 14 and receives the harvesting signal $VIN_{DCDC}$; and a DC-DC converter 16, connected to the storage capacitor 15 for receiving the electrical energy stored and generating at output a regulated signal $V_{REG}$, which is then supplied to an electrical load (here not illustrated), for its supply or recharge.

According to one aspect of the present solution, and as will also be described in detail hereinafter, the harvesting interface 14 comprises: a tracking switch $SW_{MPPT}$, which is connected between the input terminal 14a and the output terminal 14b of the harvesting interface 14 and is controlled by a control signal $V_{SWMPPT}$; a sample-and-hold (S&H) stage 22, configured to sample the value Voc of the transduction signal $V_{TRANSD}$, generated by the transducer 12 in an open-circuit or loadless condition, at appropriate time intervals, to generate the optimized value $V_{MPPT}$ (see the foregoing discussion) starting from the value $V_{OC}$, and to generate an upper threshold voltage $VTH_{UP}$ and a lower threshold voltage $VTH_{DOWN}$, which satisfy the relation $VTH_{DOWN} < V_{MPPT} < VTH_{UP}$, on the basis of the optimized value $V_{MPPT}$; a comparator stage 24, with hysteretic voltage control, on the basis of the upper and lower threshold voltages $VTH_{UP}$, $VTH_{DOWN}$, which generates at output an enabling signal $EN_{DCDC}$ for the DC-DC converter 16; and a timing stage 25, which generates appropriate control and timing signals for operation of the harvesting interface 14, amongst which the aforesaid control signal $V_{SWMPPT}$.

In general, operation of the harvesting interface 14 envisages, upon opening of the tracking switch $SW_{MPPT}$, sampling of the value of the transduction signal $V_{TRANSD}$, with the transducer 12 operating in loadless conditions, and corresponding generation of the upper and lower threshold voltages $VTH_{UP}$, $VTH_{DOWN}$; and subsequently, upon closing of the tracking switch $SW_{MPPT}$, generation of the harvesting signal $VIN_{DCDC}$, with a value comprised between the upper and lower threshold voltages $VTH_{UP}$, $VTH_{DOWN}$ (thanks to the hysteretic control by the comparator stage 24), and thus about the optimized value $V_{MPPT}$. Given that, for closing of the tracking switch $SW_{MPPT}$, the value of the harvesting signal $VIN_{DCDC}$ coincides with the value of the transduction signal $V_{TRANSD}$, the condition of energy transfer into the storage capacitor 15 thus occurs in an MPPT condition, with substantially maximum efficiency and substantially maximum coupling between the transducer 12 and the harvesting interface 14.

Conveniently, the S&H stage 22 is controlled by the timing stage 25 for sampling and periodically refreshing the value $V_{OC}$ and consequently the values of the upper and lower threshold voltages $VTH_{UP}$, $VTH_{DOWN}$ in such a way as to react promptly and adapt to possible variations of the operating conditions of the transducer 12.

In detail, the S&H stage 22 of the harvesting interface 14 comprises: a sampling switch $SW_{S\&H}$, which is connected between the input terminal 14a of the harvesting interface 14 and a first internal node N1 and receives a control signal $V_{SWS\&H}$; a voltage divider 30, formed by a first dividing resistor $R1_{S\&H}$, connected between the first internal node N1 and a second internal node N2, and a second dividing resistor $R2_{S\&H}$, connected between the second internal node N2 and a reference terminal, or ground, GND (both dividing resistors $R1_{S\&H}$, $R2_{S\&H}$ have a resistance value much higher than the value of the series resistance of the equivalent generator of the transducer 12); a first decoupling switch SW1, which is connected between the second internal node N2 and a third internal node N3 and receives a control signal $V_{SW1}$; a first holding capacitor $C1_{S\&H}$, connected between the third internal node N3 and the reference terminal GND; a first voltage-generator module 32, which is connected between the third internal node N3 and a fourth internal node N4 and is designed to generate an offset voltage $V_{OS}$; a second voltage-generator module 34, which is connected between the third internal node N3 and a fifth internal node N5 and is designed to generate the same offset voltage $V_{OS}$; a second holding capacitor $C2_{S\&H}$, connected between the fourth internal node N4 and the reference terminal GND; and a third holding capacitor $C3_{S\&H}$, connected between the fifth internal node N5 and the reference terminal GND.

The comparator stage 24 comprises: a comparator 35, including in a per se known manner an appropriately configured operational amplifier, having a first input terminal connected to the output terminal 14b of the harvesting interface 14, a second input terminal, and an output terminal, which is connected to an enabling input of the DC-DC converter 16 and is designed to supply the enabling signal $EN_{DCDC}$; a first comparison switch $SW1_{COMP}$, which is connected between the fourth internal node N4 of the harvesting interface 14 and the second input terminal of the comparator 35 and receives a control signal $V_{SW1COMP}$; and a second comparison switch $SW2_{COMP}$, which is connected between the fifth internal node N5 of the harvesting interface 14 and the second input terminal of the comparator 35, and receives, as a control signal, the enabling signal $EN_{DCDC}$.

The timing stage 25, including in a per se known manner (not described in detail herein), an oscillator circuit, is configured to generate the control signals $V_{SWMPPT}$, $V_{SWMS\&H}$, $V_{SW1}$, $V_{SW1COMP}$ for the switches $SW_{MPPT}$, $SW_{MS\&H}$, SW1, $SW1_{COMP}$, according to a timing algorithm described in detail hereinafter. As will be discussed hereinafter, the timing stage 25 may supply further control signals for further switches that may be present in the circuit.

Figure 4:
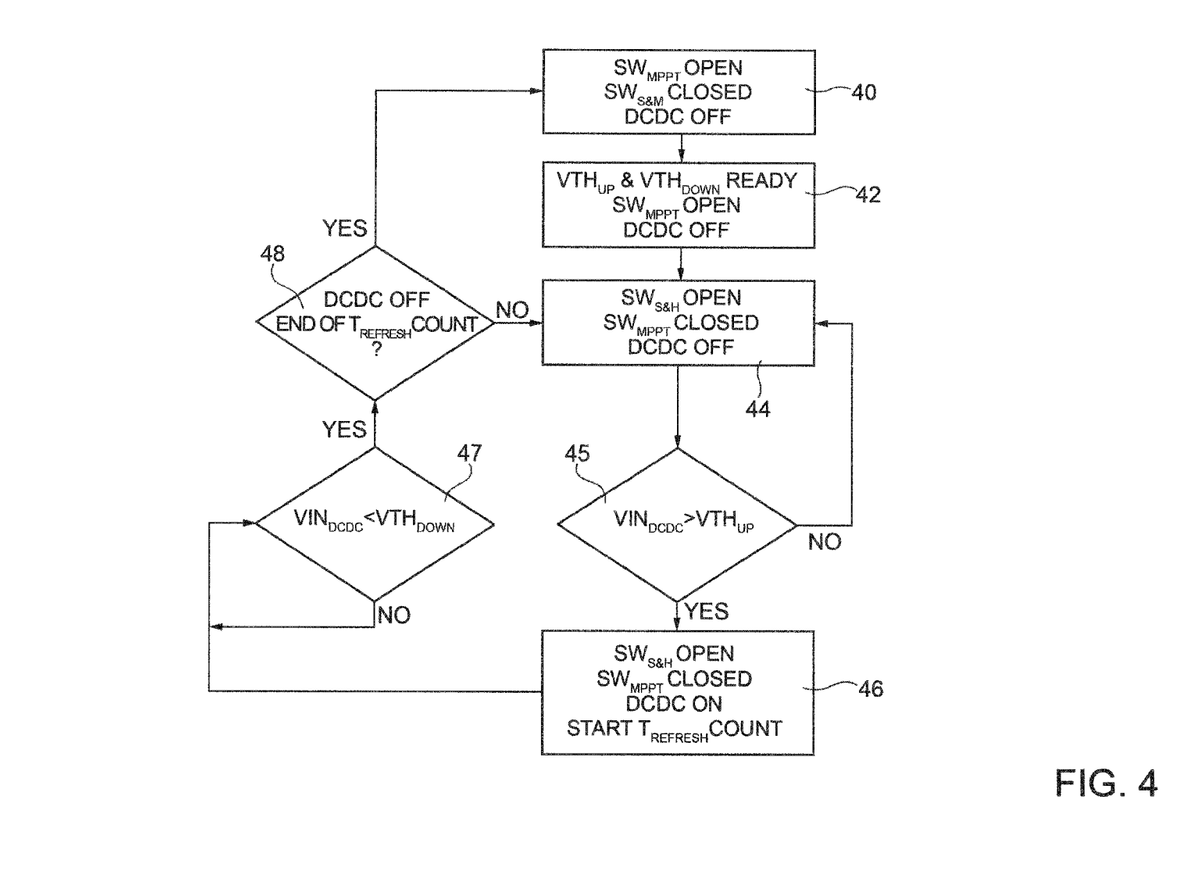
FIG. 4 shows a flowchart relating to operations performed by a harvesting interface in the system of FIG. 3.

With reference also to the flowchart of FIG. 4, operation of the harvesting interface 14 envisages that in an initial step 40 the value of the loadless or open-circuit voltage $V_{OC}$ of the transduction signal $V_{TRANSD}$ supplied by the transducer 12 is sampled and held.

For this purpose, the tracking switch $SW_{MPPT}$ is driven into the opening condition, and the sampling switch $SW_{S\&H}$ is driven into the closing condition; in this step, the DC-DC converter 16 is turned off, and the first decoupling switch SW1 is further driven into the closing condition.

The transducer 12 operates substantially in an open-circuit condition, given that the resistance as a whole supplied by the voltage divider 30 is much higher than its own equivalent series resistance, so that the value of the transduction signal $V_{TRANSD}$ that is supplied and that is present on the first internal node N1 substantially coincides with the loadless or open-circuit voltage $V_{OC}$.

In this situation, the voltage divider 30, by an appropriate choice of the division ratio, generates on the second internal node N2 a sampled voltage $V_{S\&H}$ having a value substantially equal to $V_{OC}/2$, in the case where the transducer 12 implements a thermoelectric cell, or comprised between $0.75 \cdot V_{OC}$ and $0.9 \cdot V_{OC}$, for example substantially equal to $0.8 \cdot V_{OC}$, in the case where the transducer 12 implements, instead, a photovoltaic cell.

In any case, the value of the sampled voltage $V_{S\&H}$ corresponds to the value that the transduction signal $V_{TRANSD}$ supplied by the transducer 12 assumes in a maximum efficiency or maximum coupling operating condition, i.e., to the optimized value $V_{MPPT}$, thus depending upon the electrical and constructional characteristics of the same transducer 12.

The first holding capacitor $C1_{S\&H}$ is consequently charged to the aforesaid optimized value $V_{MPPT}$ assumed by the sampled voltage $V_{S\&H}$.

In detail, the sampled voltage $V_{S\&H}$ is given by the following expression:

$$V_{S\&H}=V_{OC} \cdot R2_{S\&H}/(R1_{S\&H}+R2_{S\&H})$$

Consequently, the values of resistance of the dividing resistors $R1_{S\&H}$, $R2_{S\&H}$ are set, or regulated, in such a way that:

$$R2_{S\&H}=R1_{S\&H}; R2_{S\&H}/(R1_{S\&H}+R2_{S\&H})=\tfrac{1}{2}$$

in the case where the transducer 12 implements a thermoelectric cell, and for example:

$$R2_{S\&H}=4 \cdot R1_{S\&H}; R2_{S\&H}/(R1_{S\&H}+R2_{S\&H})=0.8$$

in the case where the transducer 12 implements a photovoltaic cell, having a maximum efficiency in the condition $V_{MPPT}=0.8 \cdot V_{OC}$.

It is noted that it is thus advantageous to provide at least one, or both, of the dividing resistors $R1_{S\&H}$, $R2_{S\&H}$ so that their resistance is configurable for generating the optimal value for the voltage $V_{MPPT}$.

Next (step 42), once again with the tracking switch $SW_{MPPT}$ open and the DC-DC converter 16 turned off, the values of the upper and lower threshold voltages $VTH_{UP}$, $VTH_{DOWN}$, at which the second and third holding capacitors $C2_{S\&H}$, $C3_{S\&H}$, respectively, are charged, are generated $$VTH_{UP}=V_{S\&H}+V_{OS}; \text{ and}$$

$$VTH_{DOWN}=V_{S\&H}-V_{OS}.$$

Then (step 44), the sampling switch $SW_{S\&H}$ is driven into the opening condition, as likewise the first decoupling switch SW1. In this way, the voltage values stored in the holding capacitors $C2_{S\&H}$, $C3_{S\&H}$ are held, but for the leakage currents, which are in any case minimized with an appropriate design of the switching elements in the circuit.

Furthermore, the tracking switch $SW_{MPPT}$ is driven into the closing condition, thus starting the step of tracking of the value of the transduction signal $V_{TRANSD}$, which enables substantially maximum efficiency and substantially maximum coupling to be obtained. The first comparison switch $SW1_{COMP}$ is further driven into the closing condition so that the second input terminal of the comparator 35 is at the upper threshold voltage $VTH_{UP}$.

As mentioned previously, the tracking step envisages that the DC-DC converter 16 is turned on/turned off via the hysteretic control of the comparator 24, which generates the enabling signal $EN_{DCDC}$, causing the harvesting signal $VIN_{DCDC}$ (and consequently the transduction signal $V_{TRANSD}$, given the presence of the short circuit defined by the tracking switch $SW_{MPPT}$ in a closing condition) to have a variable trend between the upper and lower threshold voltages $VTH_{UP}$, $VTH_{DOWN}$, thus around the sampled voltage $V_{S\&H}$, i.e., the optimized value $V_{MPPT}$.

In detail, the DC-DC converter 16 stays off as long as the value of the harvesting signal $VIN_{DCDC}$ is lower than the upper threshold voltage $VTH_{UP}$, as verified in step 45.

As soon as the value of the harvesting signal $VIN_{DCDC}$ exceeds the upper threshold voltage $VTH_{UP}$, step 46 (subsequent to step 45), the enabling signal $EN_{DCDC}$ switches (going, for example, to the high state), enabling the DC-DC converter 16, which is consequently turned on.

It should be noted that switching of the same enabling signal $EN_{DCDC}$ further controls closing of the second comparison switch $SW2_{COMP}$, so that the second input terminal of the comparator 35 goes to the lower threshold voltage $VTH_{DOWN}$, thus guaranteeing hysteretic operation of the comparator 25.

Furthermore, activation of the DC-DC converter 16 entails a decrease in the value of the harvesting signal $VIN_{DCDC}$, since the average current in the DC-DC converter 16 (when it is on) is higher than the current supplied by the transducer 12. In this step, the capacitance of the storage capacitor 15 is thus discharged with substantially constant current (when, instead, the DC-DC converter 16 is off, the same capacitance is charged by the transducer 12).

In the same step 46, count of a refresh time interval is started, following upon which, as described in detail hereinafter, the values of the sampled voltage $V_{S\&H}$ and of the threshold voltages $VTH_{UP}$, $VTH_{DOWN}$ will have to be updated.

The DC-DC converter 16 remains on as long as the value of the harvesting signal $VIN_{DCDC}$ is higher than the lower threshold voltage $VTH_{DOWN}$, as verified in step 47.

As soon as the value of the harvesting signal $VIN_{DCDC}$ drops below the lower threshold voltage $VTH_{DOWN}$, the enabling signal $EN_{DCDC}$ switches again (going, for example, to the low state), disabling the DC-DC converter 16, which is consequently turned off (step 48).

Switching of the same enabling signal $EN_{DCDC}$ further controls opening of the second comparison switch $SW2_{COMP}$ so that the second input terminal of the comparator 35 once again goes to the upper threshold voltage $VTH_{UP}$.

Furthermore, deactivation of the DC-DC converter 16, entails an increase in the voltage of the harvesting signal $VIN_{DCDC}$ on account of the current drawn by the transducer 12.

The aforesaid steps of increase and decrease of the value of the harvesting signal $VIN_{DCDC}$ (and consequently of the transduction signal $V_{TRANSD}$) repeats one after the other until the refresh time interval reaches a desired value (this value may conveniently be regulated, also during operation of the circuit), as verified in the same step 48.

In this case, from step 48, control returns to the initial step 40, for a new sampling of the open-circuit voltage $V_{OC}$ supplied by the transducer 12, and refresh of the sampled voltage values and of the threshold values, in a manner altogether similar to what has been described previously.

Figure 5:
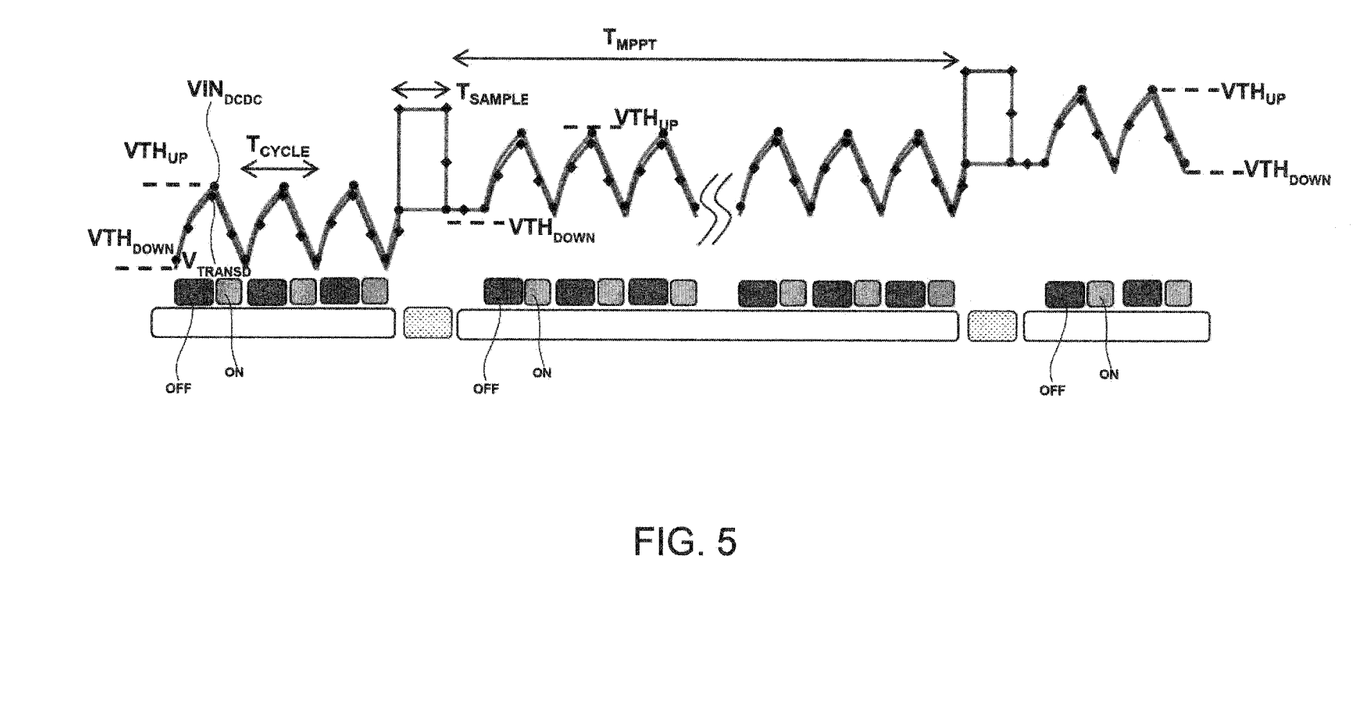
FIGS. 5 and 6a-6b show plots of electrical quantities associated with the harvesting interface.

The operation described will be better understood with reference also to the diagrams of FIG. 5, which show the plots of the harvesting signal $VIN_{DCDC}$ and of the transduction signal $V_{TRANSD}$, during the steps of tracking of the MPPT condition, with duration $T_{MPPT}$, and of refresh and sampling, with duration $T_{SAMPLE}$; further indicated are the time intervals in which the DC-DC converter 16 is on and those in which the DC-DC converter 16 is off, in each on/off cycle, having a duration $T_{CYCLE}$.

In particular, the time interval $T_{MPPT}$ is much longer than the time interval $T_{SAMPLE}$: $T_{MPPT} \gg T_{SAMPLE}$.

In general, time interval $T_{MPPT}$ depends on the field of application, in particular on the fact that the environmental conditions to which the transducer 12 is subjected change rapidly; for example, the time interval $T_{SAMPLE}$ may be of the order of some tens of milliseconds (for example, 25 ms) and the time interval $T_{MPPT}$ may range from some seconds to some tens of seconds.

The above characteristic advantageously enables a considerable reduction of the average current consumption. During the tracking step, in effect, only the comparator 25 is on, with a resulting extremely low current consumption.

Purely by way of example, in the aforesaid FIG. 5, the open-circuit voltage $V_{OC}$ supplied by the transducer 12 increases with each refresh of the values sampled. It is, however, altogether evident that, upon start of the refresh time interval, the value of the transduction signal $V_{TRANSD}$ may vary arbitrarily (for example, as a function of the changed environmental conditions, in terms of temperature or conditions of lighting), thus being able to increase, or even decrease, with respect to the immediately preceding step, according to the environmental stimulus.

Figure 6A:
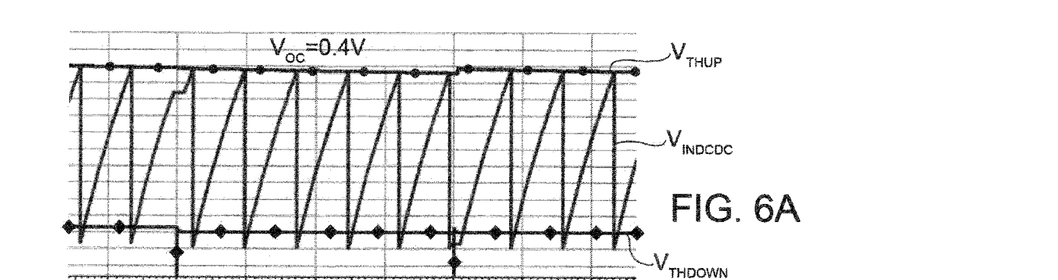
Figure 6B:
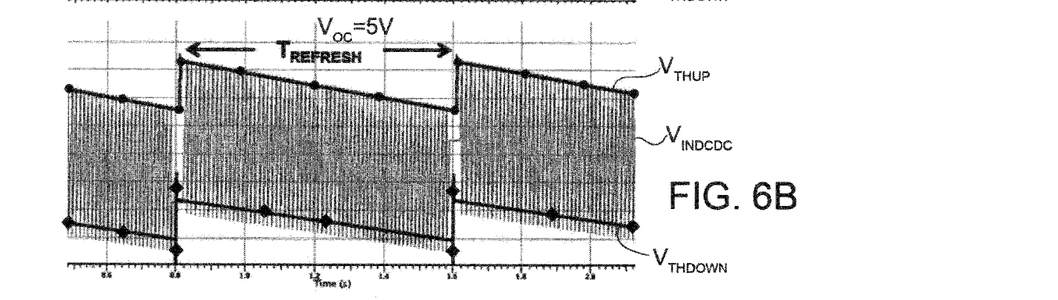

As illustrated in FIGS. 6a, 6b, corresponding to an increase of the open-circuit voltage $V_{OC}$ supplied by the transducer 12 is a decrease in the time interval $T_{CYCLE}$, defined previously; thus, a larger number of cycles during the step of tracking of the MPPT condition occur.

By way of example, FIG. 6a refers to a voltage $V_{OC}$ of 0.4 V, whereas FIG. 6b refers to a voltage $V_{OC}$ of 5 V.

Figure 7:
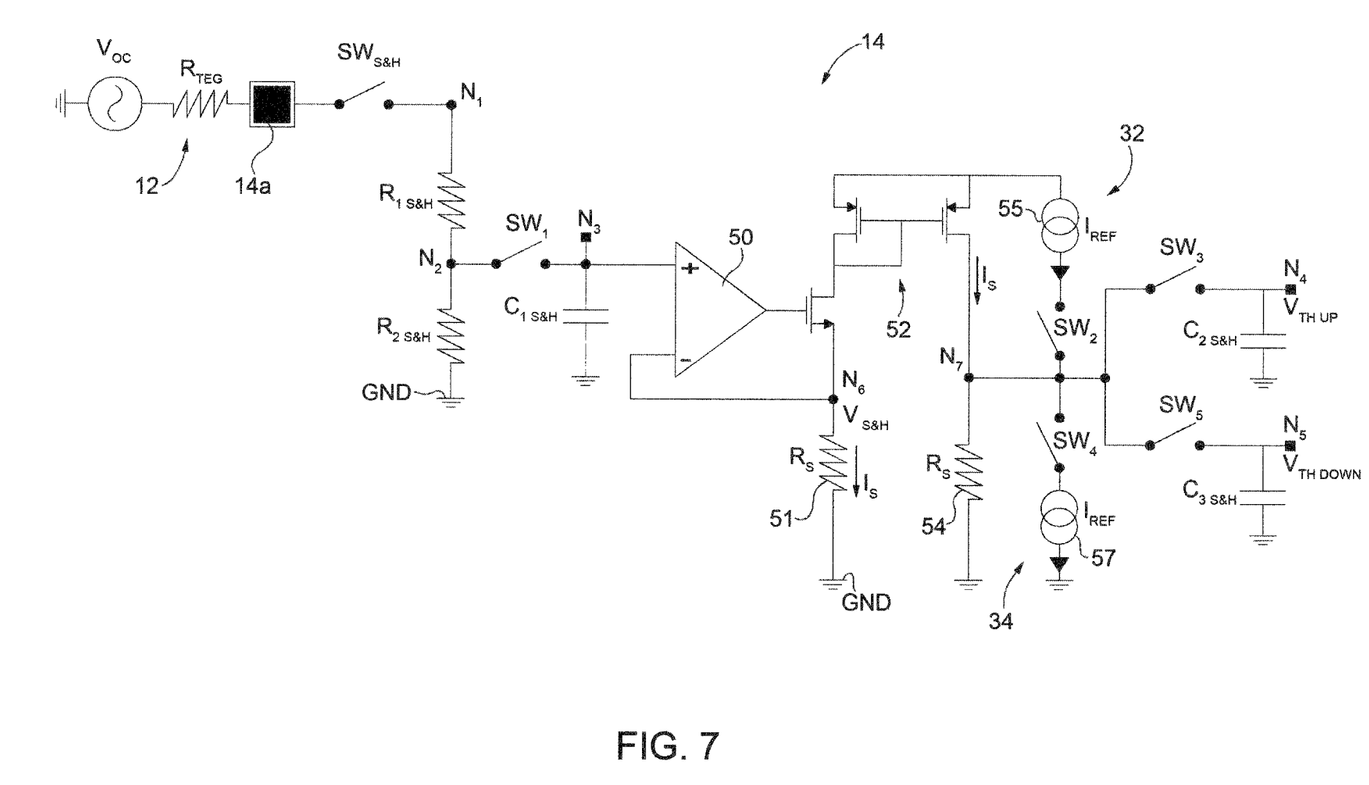
FIG. 7 shows a more detailed circuit diagram of one embodiment of the harvesting interface.

FIG. 7 shows a possible circuit implementation for providing the first and second voltage-generator modules 32, 34, which enables substantially negligible leakage currents to be obtained.

In particular, the harvesting interface 14 (of which elements already described previously with reference to FIG. 3 are not described again) comprises in this case a voltage-tracking amplifier 50, having its input connected to the third internal node $N_3$ and its output defining a sixth internal node $N_6$, onto which the sampled voltage $V_{S\&H}$ is thus brought.

Connected between the sixth internal node $N_6$ and the reference terminal GND is a first mirroring resistor 51 with resistance $R_S$, through which a mirroring current $I_S$, equal to $V_{S\&H}/R_S$, is consequently generated.

The harvesting interface 14 further comprises a current mirror 52 (obtained in a per se known manner, not described in detail herein), having a mirroring branch connected to the sixth internal node $N_6$ and a mirrored branch connected to a seventh internal node $N_7$, on which the mirroring current $I_S$ is mirrored.

Connected between the seventh internal node $N_7$ and the reference terminal GND is a second mirroring resistor 54 with the same resistance $R_S$, so that on the seventh internal node $N_7$ there is the same sampled voltage $V_{S\&H}$.

The first voltage-generator module 32 is formed in this case by: a first current generator 55, which may be selectively connected to the seventh internal node $N_7$ by a second decoupling switch SW2 and generates a reference current $I_{ref}$; and a third decoupling switch SW3, designed to connect the seventh internal node $N_7$ selectively to the fourth internal node $N_4$, on which the upper threshold voltage $VTH_{UP}$ is present during operation. The first current generator 55 may be obtained in any known way.

The second voltage-generator module 34 is in turn formed by: a second current generator 57, which may be selectively connected to the same seventh internal node $N_7$, as an alternative to the first current generator 55, via a fourth decoupling switch SW4, and generates the same reference current $I_{ref}$; and a fifth decoupling switch SW5, designed to connect the seventh internal node $N_7$ selectively to the fifth internal node $N_5$, on which the lower threshold voltage $VTH_{DOWN}$ is present during operation. Also the second current generator 55 may be obtained in any known way.

The second, third, fourth, and fifth decoupling switches receive respective control signals from the same timing stage 25 (in a way not illustrated here, and as it has been discussed previously).

Operation of the circuit described envisages, as mentioned previously, in an initial step, sampling of the open-circuit voltage of the transducer 12 by closing of the sampling switch $SW_{S\&H}$ and of the first decoupling switch SW1, and consequent generation on the third internal node N3 of the sampled voltage $V_{S\&H}$, having a value corresponding to the optimized value $V_{MPPT}$.

Next, the sampling switch $SW_{S\&H}$ and the first decoupling switch SW1 are both opened, and the sampled voltage $V_{S\&H}$ is held on the first holding capacitor $C1_{S\&H}$.

Next, but once again within the sampling time interval $T_{SAMPLE}$, the second and third decoupling switches SW2, SW3 are first closed (with the fourth and fifth decoupling switches SW4, SW5 open) so that on the seventh internal node N7, and consequently on the fourth internal node N4, the voltage $VTH_{UP}=V_{S\&H}+I_{REF}\cdot R_S$ is generated (note that the aforesaid offset voltage $V_{OS}$ consequently corresponds here to $I_{REF}\cdot R_S$).

Next, once again within the sampling time interval $T_{SAMPLE}$, the second and third decoupling switches SW2, SW3 are opened, and the fourth and fifth decoupling switches SW4, SW5 are closed so that the voltage $VTH_{DOWN}=V_{S\&H}-I_{REF}\cdot R_S$ is generated on the seventh internal node N7, and consequently on the fifth internal node N5.

Next, also the fourth and fifth decoupling switches SW4, SW5 are opened so that the upper and lower threshold voltages $VTH_{UP}$, $VTH_{DOWN}$ are held on the respective second and third holding capacitors $C2_{S\&H}$, $C3_{S\&H}$ (for the entire duration of the subsequent tracking time interval $T_{MPPT}$), with minimal leakage currents through the open switches.

In this regard, the present Applicant has realized: a substantially maximum dispersion by the holding capacitors $C2_{S\&H}$, $C3_{S\&H}$ equal to 10 mV/s with an open-circuit voltage $V_{OC}$ of 0.4 V (that is, equal to 5% of the optimal voltage $V_{MPPT}$, in the example 0.2 V, considering a duration of the time interval $T_{MPPT}$ of one second); and a substantially maximum dispersion by the same holding capacitors $C2_{S\&H}$, $C3_{S\&H}$ equal to 100 mV/s with an open-circuit voltage $V_{OC}$ of 5V (equal approximately to 2% of the optimal voltage $V_{MPPT}$, in the example 2.5V, considering once again a duration of the time interval $T_{MPPT}$ of one second).

The performance achieved by the harvesting interface 14 is further highlighted by the plots of FIGS. 8a-8d, which refer to use with a transducer 12 of a thermoelectric type, having the following characteristics: series resistance $R_{TEG}$ of 20 kΩ, open-circuit voltage $V_{OC}$ comprised between 1 V (minimum value) and 5 V (maximum value).

Figure 8A:
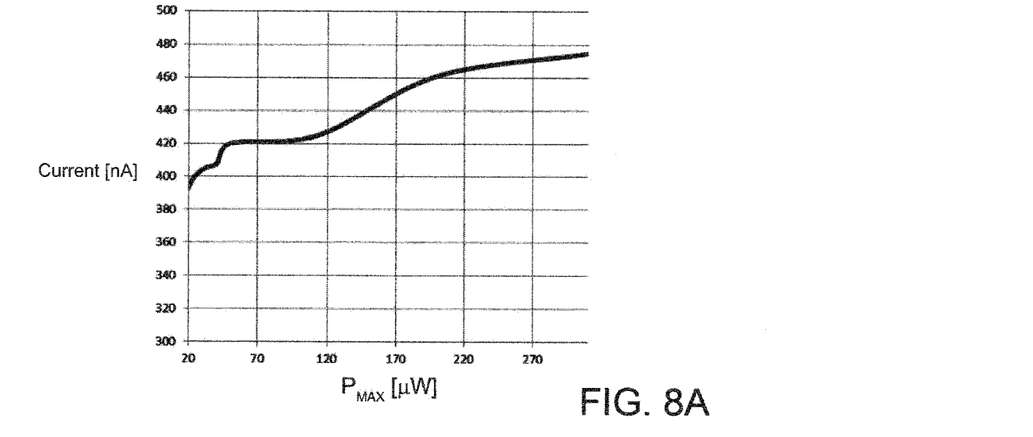
FIGS. 8a-8d show plots relating to the electrical performance of the harvesting interface.

In detail, FIG. 8a shows the average consumption of the S&H stage 22 as the average power delivered by the transducer 12 (available power $P_{MAX}$) varies. It should be noted that this consumption is very contained and barely dependent upon the average power delivered, and thus barely dependent upon the environmental conditions in which the transducer 12 operates and upon the electrical characteristics of the same transducer 12.

Figure 8B:
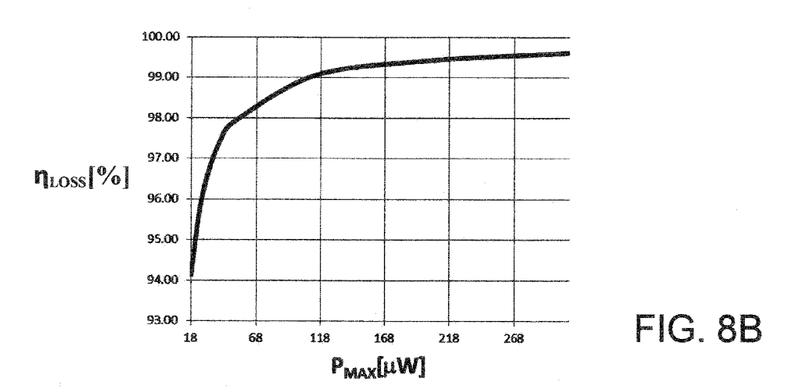

FIG. 8b shows the plot of the factor $\eta_{LOSS}$ (see the foregoing discussion) as a function of the same power $P_{MAX}$.

Figure 8C:
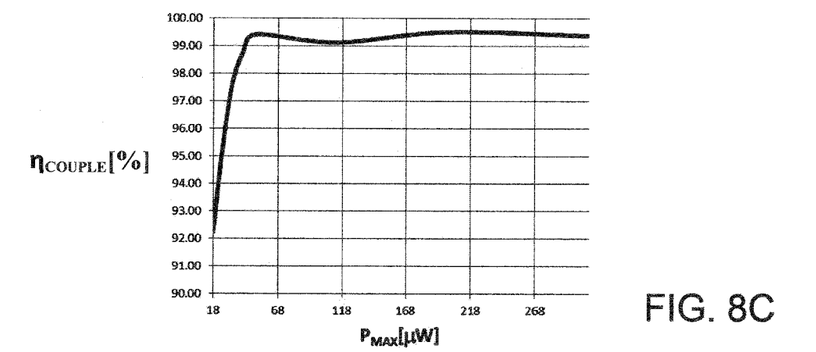

FIG. 8c shows the plot of the factor $\eta_{COUPLE}$ (see the foregoing discussion), once again as a function of the power $P_{MAX}$.

Figure 8D:
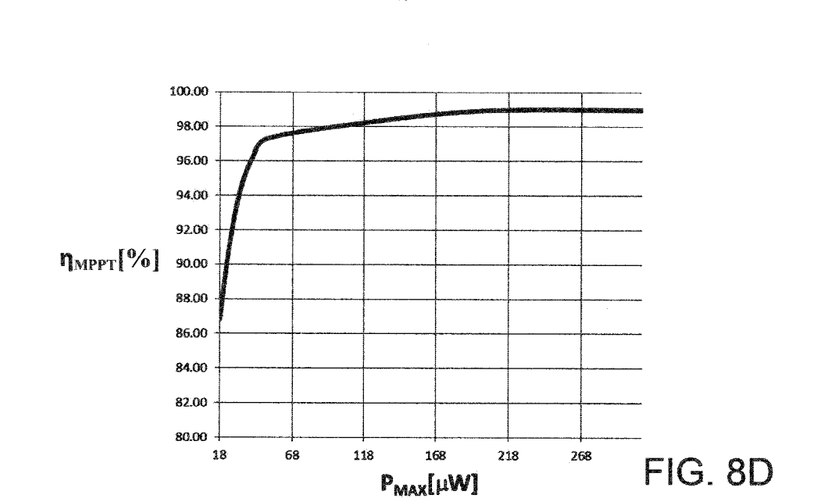

FIG. 8d shows the plot of the efficiency $\eta_{MPPT}$ (see the foregoing discussion) once again as a function of the power $P_{MAX}$.

In particular, it is to be noted that the efficiency $\eta_{MPPT}$ is higher than 90% with an available power of 20 μW, and rises above 98% with an available power higher than 100 μW.

The advantages of the proposed solution emerge clearly from the foregoing description.

In particular, the hysteretic voltage control for tracking of the MPPT condition enables a considerable saving in power consumption, for example as compared to a continuous-time control solution.

For instance, the condition $T_{MPPT}\gg T_{SAMPLE}$ enables considerable accuracy in tracking of the aforesaid MPPT condition and a very high value of the factor $\eta_{COUPLE}$ to be achieved.

Furthermore, the harvesting interface 14 does not envisage the use of further DC/DC converters to ensure the MPPT condition, thus reducing the number of external components required; a voltage control is in fact implemented, instead of a duty-cycle control, as in many known solutions.

In this regard, it is further pointed out that in the solution described, the holding capacitors are advantageously all obtained using integrated technology, not as external components (in fact, thanks to the reduction of the leakage currents, the value of the same capacitors may not be high).

The solution described further proves very flexible, enabling easy adaptation to use with different photovoltaic or thermoelectric cells; in particular, it is sufficient to regulate the division factor of the sampled voltage $V_{S\&H}$ via the voltage divider 30 to obtain a condition of improved matching.

Furthermore, once the operating mode has been selected, with a thermoelectric cell or a photovoltaic cell, the efficiency of tracking of the MPPT condition is found to be independent of the electrical parameters of the transducer 12, for example of the corresponding equivalent resistance or the corresponding open-circuit voltage.

As mentioned previously, the energy harvesting system may advantageously be used for electrical supply of a device, which may even be without any battery, or equipped with a rechargeable battery.

Figure 9:
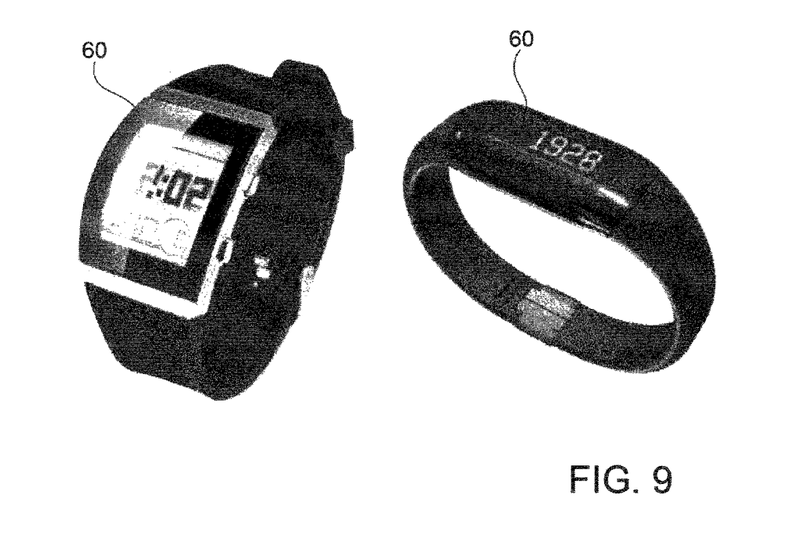
FIG. 9 shows, by way of example, an electronic device, in particular a bracelet or an electronic watch, including the energy harvesting system.

By way of example, FIG. 9 shows an electronic bracelet or watch 60, which incorporates the energy harvesting system for generation of electrical energy by exploiting the difference of temperature between the environment and the human body (the transducer 12 is in this case of a thermoelectric type). The electronic bracelet 60 may advantageously be used in the field of fitness, for example for counting the steps made by a user.

Finally, it is clear that modifications and variations may be made to what has been described and illustrated herein, without thereby departing from the scope of the present disclosure, as defined in the annexed claims.

In particular, the energy harvesting system 10 may comprise a plurality of transducers 12, all of the same type or of a type different from one another.

Furthermore, it is evident that the energy harvesting system 10 may advantageously be used for other applications and other electronic devices, for example in the automotive field, or also in a mobile electronic device or in a garment or other article of clothing, for example in footwear, in the consumer electronics field (any mobile application), the industrial field (for example, in controlling processes that involve environments with high thermal gradients), or in the field of home automation (for example, in combination with photovoltaic generators).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electrical-energy harvesting system, comprising:
a transducer to convert energy from an environmental energy source into a transduced signal;
a harvesting interface to receive the transduced signal on an input terminal and to supply an electrical-energy harvesting signal on an output terminal;
an energy storage element coupled to the output terminal of the harvesting interface to receive the electrical-energy harvesting signal;
a voltage converter coupled to the output terminal to generate a regulated voltage, wherein the harvesting interface is configured to:
sample an open-circuit voltage value of the transduced signal;
couple the output terminal to the input terminal during a tracking operating condition;
generate an optimized voltage value starting from the open-circuit voltage value;
decouple the output terminal from the input terminal during a refresh operating condition of sampling said open-circuit voltage value;
generate an upper threshold voltage based on the optimized voltage value during said refresh operating condition;
generate a lower threshold voltage based on the optimized voltage value during said refresh operating condition; and
control the voltage converter in a switching mode to thereby maintain the electrical-energy harvesting signal between the upper and lower threshold voltages in said tracking operating condition.

2. The system according to claim 1, wherein the tracking operating condition is a condition of maximum power-point tracking.

3. The system according to claim 2, wherein the harvesting interface further comprises:
a timing stage to generate control and timing signals to first determine said tracking operating condition and then to determine said refresh operating condition.

4. The system according to claim 3, wherein said timing stage is configured to:
cyclically determine execution of said refresh operating condition to direct updating said open-circuit voltage value and said upper and lower threshold voltages and execution of said tracking operating condition following upon each new execution of said refresh operating condition.

5. The system according to claim 1, wherein said optimized voltage value corresponds to a condition of substantially maximum coupling between said transducer and said harvesting interface.

6. The system according to claim 1, wherein:

$$VTH_{DOWN} < V_{MPPT} < VTH_{UP},$$

where $V_{MPPT}$ is the optimized voltage value, $VTH_{DOWN}$ is the lower threshold voltage, and $VTH_{UP}$ is the upper threshold voltage.

7. The system according to claim 1, wherein the harvesting interface comprises
a voltage divider to generate the optimized voltage value starting from a sampled value of said open-circuit voltage, said optimized voltage being substantially equal to 50 percent of the sampled value of said open circuit voltage supplied by the transducer.

8. The system according to claim 1, wherein the harvesting interface comprises:
a voltage divider to generate the optimized voltage value starting from a sampled value of said open-circuit voltage, said optimized voltage being between about 75 percent and about 90 percent of the sampled value of said open circuit voltage supplied by the transducer.

9. An electronic device, comprising:
a transducer to convert energy from an environmental or mechanical energy source into a transduced signal;
a harvesting interface to receive the transduced signal on an input terminal and to supply an electrical-energy harvesting signal on an output terminal;
an energy storage element coupled to the output terminal of the harvesting interface to receive the electrical-energy harvesting signal;
a voltage converter coupled to the output terminal to generate a regulated voltage, wherein the harvesting interface is configured to:
sample an open-circuit voltage value of the transduced signal;
couple the output terminal to the input terminal during a tracking operating condition;
control the voltage converter in a switching mode to thereby maintain the electrical-energy harvesting signal between an upper threshold voltage and a lower threshold voltages in said tracking operating condition;
decouple the output terminal from the input terminal during a refresh operating condition of sampling said open-circuit voltage value;
generate said upper and lower threshold voltages during said refresh operating condition; and
cyclically execute said tracking operating condition following upon each new execution of said refresh operating condition; and
an electrical load to receive the regulated voltage.

10. The electronic device according to claim 9, wherein said electrical load includes a rechargeable battery.

11. The electronic device according to claim 9, wherein said transducer includes at least one of a photovoltaic and a thermoelectric device.

12. The electronic device according to claim 9, wherein said electronic device is a mobile electronic device, an automotive device, an industrial device, an article of clothing, or a fitness device.

13. The electronic device according to claim 9, wherein said tracking operating condition is a condition of maximum power-point tracking.

14. The electronic device according to claim 9, wherein:

$$VTH_{DOWN} < V_{MPPT} < VTH_{UP},$$

where $V_{MPPT}$ is the optimized voltage value, $VTH_{DOWN}$ is a lower threshold voltage, and $VTH_{UP}$ is an upper threshold voltage.

15. An electrical-energy harvesting method, comprising:
by a transducer, converting energy from an environmental energy source into a transduced signal;
by a harvesting interface:
receiving the transduced signal on an input terminal;
supplying an electrical-energy harvesting signal on an output terminal;
sampling an open-circuit voltage value of the transduced signal;
coupling the output terminal to the input terminal during a tracking operating condition;
generating an optimized voltage value starting from the open-circuit voltage value;
decoupling the output terminal from the input terminal during a refresh operating condition of sampling said open-circuit voltage value;
generating an upper threshold voltage based on the optimized voltage value during said refresh operating condition;
generating a lower threshold voltage based on the optimized voltage value during said refresh operating condition; and
controlling a voltage converter in a switching mode to maintain the electrical-energy harvesting signal between the upper and lower threshold voltages in said tracking operating condition;
by an energy storage element coupled to the output terminal of the harvesting interface, receiving the electrical-energy harvesting signal and storing electrical energy; and
by the voltage converter coupled to the output terminal, generating a regulated voltage.

16. The method according to claim 15, wherein said tracking operating condition is a condition of maximum power-point tracking.

17. The method according to claim 16, further comprising, by a timing stage of the harvesting interface:
generating control and timing signals to first determine said tracking operating condition and then to determine said refresh operating condition.

18. The method according to claim 17, further comprising, by the timing stage:
cyclically determining execution of said refresh operating condition;
updating said open-circuit voltage value and said upper and lower threshold voltages; and
executing said tracking operating condition following upon each new execution of said refresh operating condition.

19. The method according to claim 15, wherein said transducer includes at least one of a photovoltaic and a thermoelectric device.

20. The method according to claim 15, wherein said transducer is integrated in a mobile electronic device, an automotive device, an industrial device, an article of clothing, or a fitness device.

* * * * *